(12) United States Patent
Griffith et al.

(10) Patent No.: US 10,949,828 B2
(45) Date of Patent: Mar. 16, 2021

(54) TRANSACTION PROCESSING BASED ON STATISTICAL CLASSIFICATION AND CONTEXTUAL ANALYSIS

(71) Applicant: INTERNATIONAL BUSINESS MACHINES CORPORATION, Armonk, NY (US)

(72) Inventors: William Griffith, Georgetown, TX (US); Erik D. Anderson, Cedar Park, TX (US); Indran Naick, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 16/021,862

(22) Filed: Jun. 28, 2018

(65) Prior Publication Data

US 2020/0005270 A1 Jan. 2, 2020

(51) Int. Cl.
*G06Q 20/22* (2012.01)
*G06Q 20/20* (2012.01)

(52) U.S. Cl.
CPC .......... *G06Q 20/227* (2013.01); *G06Q 20/20* (2013.01)

(58) Field of Classification Search
CPC ....... G06Q 20/20; G06Q 20/22; G06Q 20/227
USPC ................................ 705/17, 18, 28; 713/182
See application file for complete search history.

(56) References Cited

U.S. PATENT DOCUMENTS

| | | | | |
|---|---|---|---|---|
| 7,353,991 B2* | 4/2008 | Esplin | .................... | G06Q 20/10 235/375 |
| 7,890,422 B1 | 2/2011 | Hirka et al. | | |
| 8,239,310 B2* | 8/2012 | Lortscher, Jr. | ......... | G06Q 40/06 705/36 R |
| 8,340,634 B2* | 12/2012 | Raleigh | ................... | H04L 12/14 455/407 |
| 8,429,069 B1* | 4/2013 | Sheehan | .............. | G06Q 50/188 705/38 |
| 8,620,790 B2* | 12/2013 | Priebatsch | ............. | G06Q 30/06 705/35 |
| 8,626,769 B1* | 1/2014 | Bhatt | ..................... | G06Q 40/12 707/740 |
| 8,965,820 B2 | 2/2015 | Kapadia et al. | | |
| 9,185,118 B1* | 11/2015 | Agrawal | ................. | G06F 21/55 |
| 9,338,658 B1* | 5/2016 | Gailloux | ............... | H04M 15/58 |

(Continued)

OTHER PUBLICATIONS

Baig, "IBM and Visa want you to pay from your car", https://www.usatoday.com/story/tech/columnist/baig/2017/02/16/ibm-and-visa-want-make-your-car-point-sale/97985630/, USA Today, Feb. 16, 2017, 3 pages.

(Continued)

*Primary Examiner* — Andrew Joseph Rudy
(74) *Attorney, Agent, or Firm* — Stephanie Carusillo; Andrew D. Wright; Roberts Calderon Safran & Cole, P.C.

(57) ABSTRACT

A computer-implemented method includes: receiving, by a computing device, transaction information for a transaction, wherein the transaction information identifies one or more items in the transaction; classifying, by the computing device, each of the one or more items; selecting, by the computing device, one or more payment accounts, of a plurality of payment accounts, to use to pay for the one or more items based on the classifying each of the one or more items; and communicating, by the computing device, with one or more payment servers to charge the one or more payment accounts for the one or more items.

20 Claims, 11 Drawing Sheets

(56) References Cited

U.S. PATENT DOCUMENTS

| | | | |
|---|---|---|---|
| 9,652,751 B2* | 5/2017 | Aaron | G06Q 20/04 |
| 9,691,096 B1* | 6/2017 | Dai | G06Q 30/0631 |
| 9,734,831 B2* | 8/2017 | Timem | H04L 63/102 |
| 9,864,988 B2* | 1/2018 | Taylor | G06Q 20/382 |
| 10,009,358 B1* | 6/2018 | Xie | G06F 21/30 |
| 10,026,062 B1* | 7/2018 | Sasmaz | G06Q 20/202 |
| 10,127,501 B2* | 11/2018 | Grigoryan | G06F 16/24554 |
| 10,129,288 B1* | 11/2018 | Xie | H04L 63/1441 |
| 10,176,370 B2* | 1/2019 | Agrawal | G06F 40/174 |
| 10,200,541 B2* | 2/2019 | Raleigh | H04M 15/61 |
| 10,521,866 B2* | 12/2019 | Lo Faro | G06Q 40/12 |
| 10,559,031 B2* | 2/2020 | Kohli | G06Q 40/02 |
| 10,616,256 B2* | 4/2020 | Kursun | G06F 16/285 |
| 10,685,251 B2* | 6/2020 | Ionita | G06K 9/00268 |
| 10,692,057 B1* | 6/2020 | Daruwalla | G06Q 20/10 |
| 2011/0087592 A1 | 4/2011 | Mitrani | |
| 2012/0284105 A1 | 11/2012 | Li | |
| 2012/0330825 A1 | 12/2012 | Shakkarwar | |
| 2013/0110709 A1 | 5/2013 | Hodge et al. | |
| 2013/0238455 A1 | 9/2013 | Laracey | |
| 2014/0006259 A1 | 1/2014 | Grigg et al. | |
| 2014/0129357 A1 | 5/2014 | Goodwin | |
| 2014/0279502 A1 | 9/2014 | Dooley et al. | |
| 2014/0279509 A1 | 9/2014 | Khilnani et al. | |
| 2017/0083898 A1* | 3/2017 | Sidhu | H04L 67/30 |
| 2017/0293909 A1 | 10/2017 | Song et al. | |
| 2017/0345105 A1 | 11/2017 | Isaacson et al. | |

OTHER PUBLICATIONS http://www.apple.com/apple-pay/, Apple Inc., accessed Jun. 19, 2018; 3 pages.

Quintos et al., "Maxing Credit Card Benefits Using Location Based Data", IP.Com, Oct. 29, 2017, 11 pages.

Mell et al., "The NIST Definition of Cloud Computing", NIST, Special Publication 800-145, Sep. 2011, 7 pages.

* cited by examiner

US 10,949,828 B2

TRANSACTION PROCESSING BASED ON STATISTICAL CLASSIFICATION AND CONTEXTUAL ANALYSIS

BACKGROUND

The present invention generally relates to transaction processing and, more particularly, to process transactions by selecting multiple different payment accounts for a given transaction based on statistical classification and contextual analysis.

An individual may own multiple different types of payment accounts from which to pay for products and services. For example, an individual may own multiple different credit card accounts, debit card accounts, store charge card accounts, bank accounts, cryptocurrency accounts, etc. When completing a purchase transaction, the individual may select a particular account to use to complete payment of the transaction (e.g., when at a point-of-sale terminal or when entering account details to complete an online transaction).

SUMMARY

In an aspect of the invention, a computer-implemented method includes: receiving, by a computing device, transaction information for a transaction, wherein the transaction information identifies one or more items in the transaction; classifying, by the computing device, each of the one or more items; selecting, by the computing device, one or more payment accounts, of a plurality of payment accounts, to use to pay for the one or more items based on the classifying each of the one or more items; and communicating, by the computing device, with one or more payment servers to charge the one or more payment accounts for the one or more items.

In an aspect of the invention, there is a computer program product for automatically selecting one or more payment accounts to pay for items in a transaction. The computer program product comprises a computer readable storage medium having program instructions embodied therewith, the program instructions executable by a computing device to cause the computing device to: receive transaction information for a transaction, wherein the transaction information identifies one or more items in the transaction; determine confidence scores for each of a plurality of payment accounts for each item in the transaction; select one or more payment accounts, of the plurality of payment accounts, to use to pay for the one or more items based on the confidence scores; and communicate with one or more payment servers to charge the one or more payment accounts for the one or more items.

In an aspect of the invention, a system includes: a processor, a computer readable memory and a computer readable storage medium associated with a computing device; program instructions to receive transaction information for a transaction, wherein the transaction information identifies one or more items in the transaction and a user profile; program instructions to apply natural language (NLC) and machine learning techniques to classify each of the one or more items based on the user profile and contextual information; program instructions to score each of a plurality of payment accounts for each item in the transaction based on the classification, the user profile, and the contextual information; program instructions to select one or more payment accounts, of the plurality of payment accounts, to use to pay for the one or more items based on the scoring; and program instructions to communicate with one or more payment servers to charge the one or more payment accounts for the one or more items. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
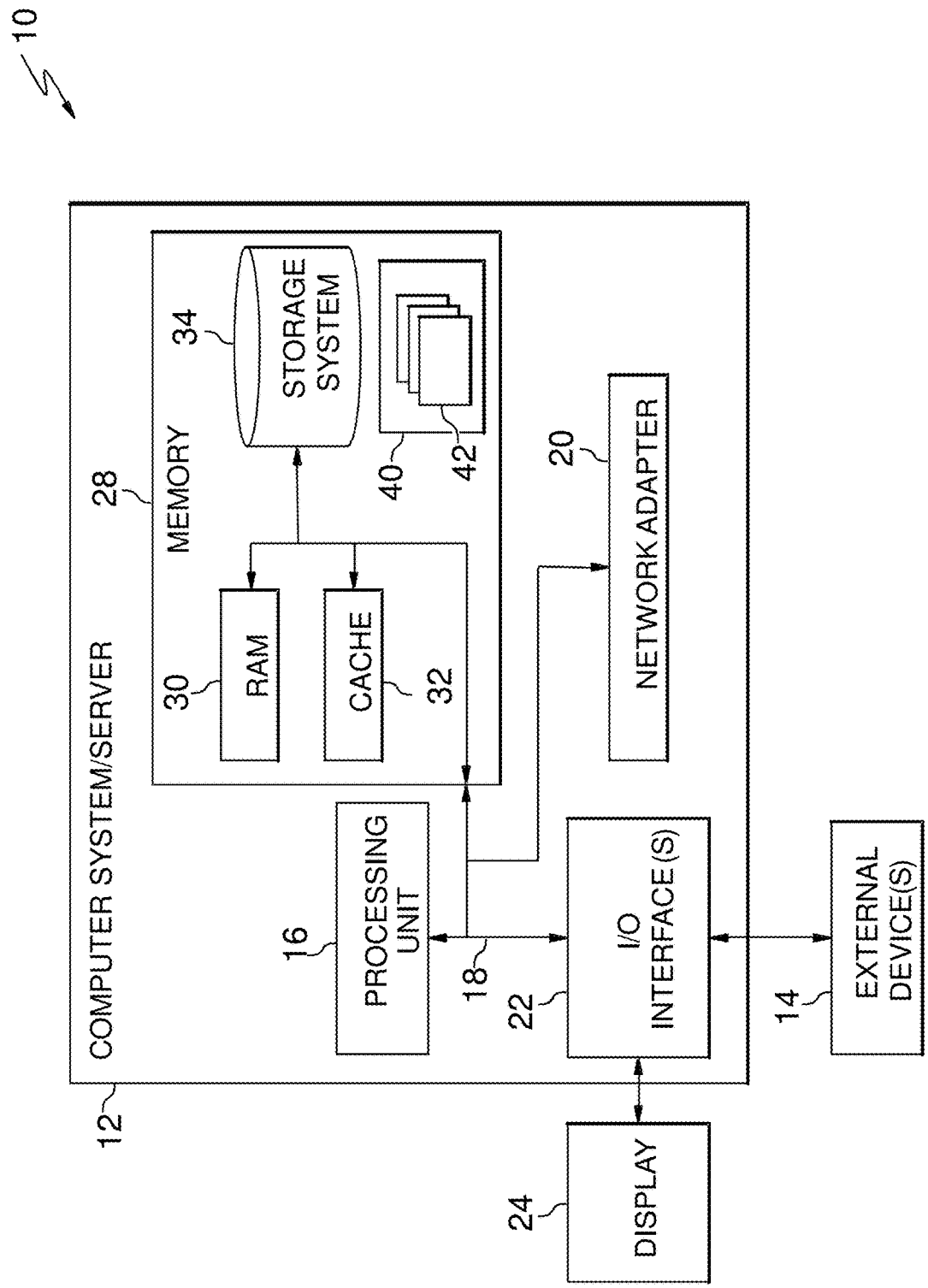
FIG. 1 depicts a cloud computing node according to an embodiment of the present invention.

The present invention generally relates to transaction processing and, more particularly, to process transactions by selecting multiple different payment accounts for a given transaction based on statistical classification and contextual analysis. When completing a purchase transaction, an individual may manually select a particular account to use to complete payment of the transaction (e.g., when at a point-of-sale terminal or when entering account details to complete an online transaction). Accordingly, aspects of the present invention may automatically select, for a user, a particular account, of a group of accounts associated with the user, to charge for a transaction. Further, aspects of the present invention may automatically select multiple different accounts to charge for a single transaction. That is, aspects of the present invention may automatically split a single transaction into multiple different charges to be paid via different payment accounts.

In embodiments, aspects of the present invention may determine which account(s) to charge based on classifying individual items in the transaction using natural language classification (NLC) and/or statistical classification techniques. Additionally, or alternatively, aspects of the present invention may determine which account(s) to charge based on additional contextual information and user-specific information that may be learned over a period of time. For example, contextual information may include transaction location, transaction merchant information (e.g., merchant name, merchant type, etc.), user calendar information, user intent, user historical payment selection choices, etc. In this way, the determination of which account to charge may be personalized and adjusted over time as a user's account selection habits are tracked and learned.

In embodiments, aspects of the present invention may determine confidence scores for each item in a transaction and each payment account associated with the user in which a confidence score represents a likelihood that the user intends to use a particular payment account for payment of the item. Aspects of the present invention may automatically charge a payment account when the confidence score satisfies a threshold, or may prompt the user to confirm or modify the payment account when the confidence score does not satisfy the threshold.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
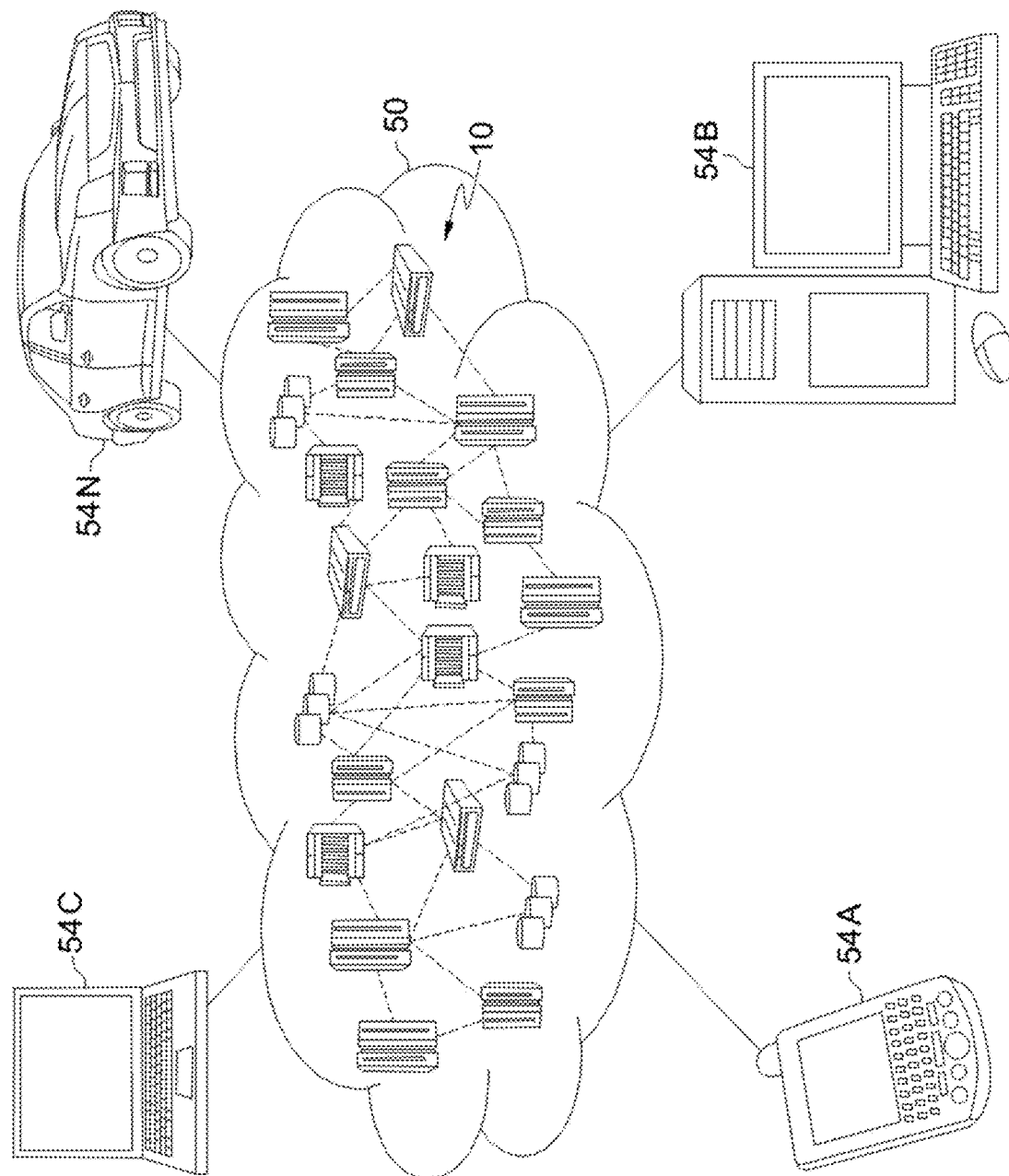
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
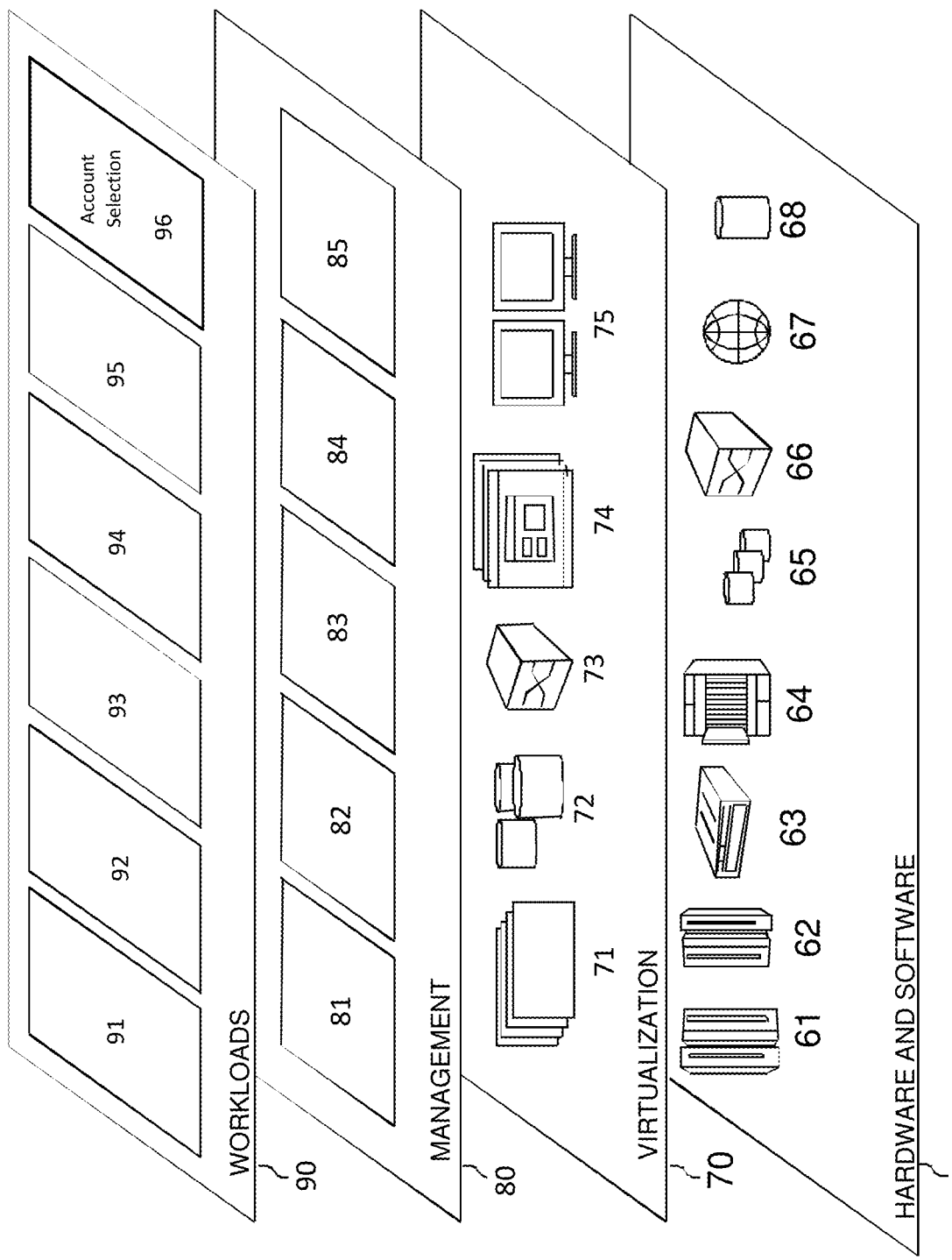
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and account selection 96.

Referring back to FIG. 1, the program/utility 40 may include one or more program modules 42 that generally carry out the functions and/or methodologies of embodiments of the invention as described herein (e.g., such as the functionality provided by account selection 96). Specifically, the program modules 42 may receive transaction information, classify each item in the transaction, determine confidence scores for each account to charge the item, prompt the user to confirm or modify the account to charge, determine a total amount to charge each particular account, and communicate with payment account servers to charge each particular payment account in accordance with the determined total amounts to charge. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a payment processing system as shown in FIG. 4A.

Embodiments of the present invention recognize the difficulty present in computer driven prediction of a user selection of a payment source. Embodiments of the present invention recognize the inherent differences in the capability of a human and that of a computing device. Embodiments of the present invention recognize that machine learning is inherently different from human learning. Embodiments of the present invention recognize that computer learning and predicting which payment source a user is likely to select based on based on statistical classification and contextual analysis is a previously unknown functionality in the field of computer-based transaction processing. As such, a computer learning and predicting which payment source a user is likely to select encompasses an improvement in the functioning of the computing device itself and embodiments of the present invention provide such an improvement. Further, embodiments of the present invention recognize that a general function of most computing devices requires the conveyance of pertinent information to a user in a manner that is understandable by the user. Embodiments of the present invention recognize that a single visual representation of a transaction may be leveraged to convey multiple types of information to a user in a manner that is predicted to enable the user to comprehend the multiple types of information. Embodiments of the present invention recognize that an improvement in visual conveyance of pertinent information to a user by a computing system encompasses an improvement to the computing system itself and embodiments of the present invention provide such an improvement.

Figure 4A:
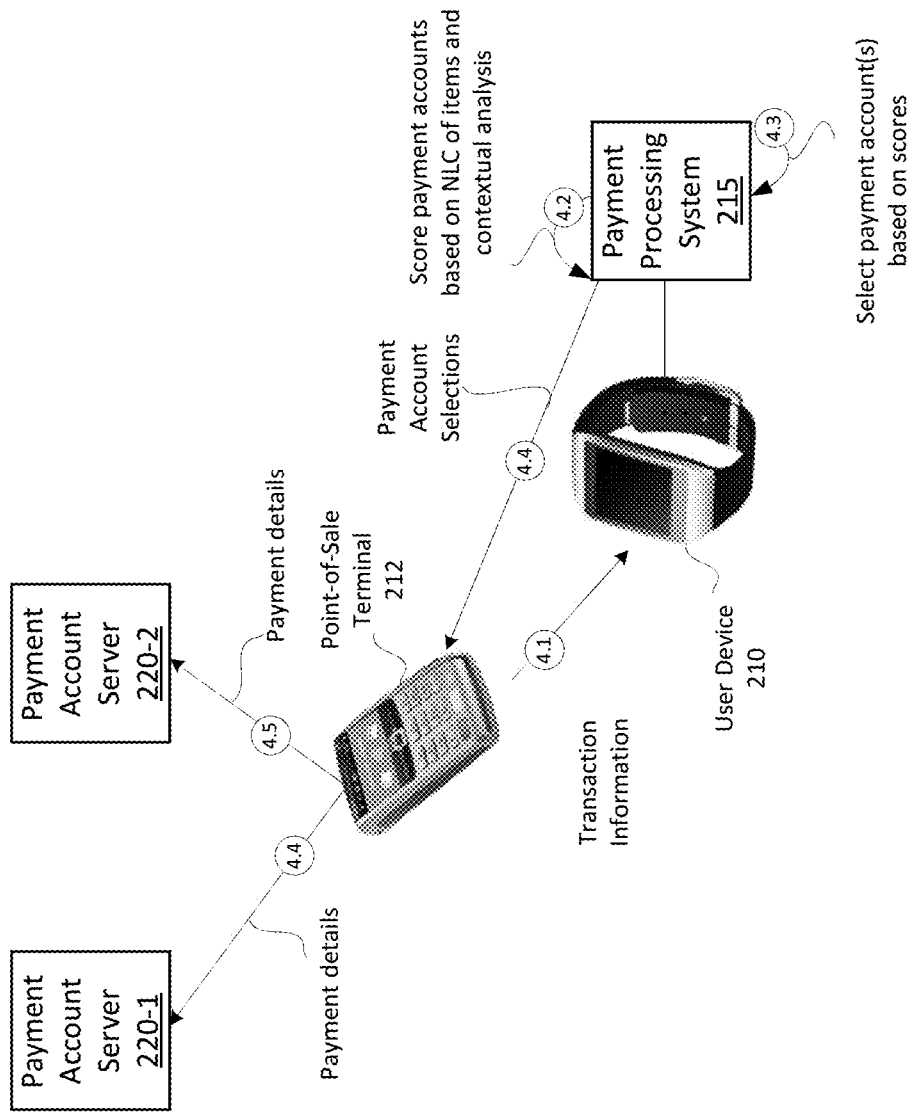
FIGS. 4A-4F show an overview of an example implementation in accordance with aspects of the present invention

FIGS. 4A-4F show an overview of an example implementation in accordance with aspects of the present invention. In FIG. 4A, the payment processing system 215 may be implemented within a user device, such as a smartphone, smart watch, or the like. The payment processing system 215 may store and/or access a user profile (e.g., based on user login information). The user profile may include electronic wallet information identifying the user's payment accounts, training data, user preferences, user personal information that the user is voluntarily sharing; information identifying payment accounts the user has historically used to pay for items of certain classifications, and/or other information that may be used to select particular ones of the user's payment accounts to use for paying for items in a transaction.

As shown in FIG. 4A, a payment processing system 215 may receive transaction information (at step 4.1). For example, the payment processing system 215 may receive online shopping information for an online transaction, or scan barcode information for items being purchased by a user in a merchant facility. At the start of a check-out process (e.g., when all items have been scanned or when a user is checking out of an online transaction), the payment processing system 215 may score payment accounts associated with the user from which to pay for the items in the transaction based on the classification of each item and based on contextual analysis of other analytics data associated with the user and/or the transaction (at step 4.2). As described herein, the score may identify a probability or confidence that the user would likely use a particular payment account to pay for a particular item in a transaction. In embodiments, the score may be based on statistical models including machine learning data and/or training data as part of those models. The machine learning data and/or training data may include, for example, accounts historically used to pay for certain types of items (e.g., accounts the user has manually selected to pay for items, or accounts that the payment processing system 215 has automatically selected to pay for items). Additionally, or alternatively, the machine learning data and/or training data may include information regarding the user's preferences, intent of the transaction, user activity, etc.

In embodiments, the payment processing system 215 may, for each item in the transaction, score the payment accounts based on a classification of the item, information in the user profile, and/or contextual analysis of contextual information. In embodiments, the payment processing system 215 may apply NLC techniques to classify each item. More specifically, the payment processing system 215 may analyze the description of the item (e.g., from a catalogue that identifies the description of the item) and apply NLC techniques to the description of the item to classify the item. Additionally, or alternatively, the payment processing system 215 may apply NLC techniques to produce customized classifications for an individual user based on the user's profile (e.g., a classification, such as "Dad's medicine" or "Son's toys," etc.). In embodiments, a database may store the classification information for the item based on an item number or other item identifier. The payment processing system 215 may factor in the classification information when scoring the payment accounts for each item.

The payment processing system 215 may perform contextual analysis to further score each payment account for each item in the transaction. For example, the payment processing system 215 may score accounts based on merchant information (e.g., type of merchant, name of merchant, location of merchant, etc.). As an illustrative example, the payment processing system 215 may be score a business payment account relatively higher when the merchant is associated with business transactions (e.g., an office supply store). Additionally, or alternatively, the payment processing system 215 may score the accounts based on contextual information, such as training data that includes user account selection history. For example, if a user has historically routinely paid for a particular classification of items (e.g., "toys") with a particular personal credit card (e.g., credit card A), the payment processing system 215 may score credit card A relatively high for items having the "toy"

classification. Additionally, or alternatively, the payment processing system 215 may score the accounts based on other contextual information or training data, such as the user's calendar indicating the user's intent or location, social media activity indicating the user's intent, etc. Additionally, or alternatively, the payment processing system 215 may score the accounts based on any variety of other contextual information, such as merchant credit card minimum transaction limits (e.g., such that a single credit card is not used to pay for items totaling less than a merchant's minimum transaction limit), credit card reward bonus categories (e.g., by scoring accounts for items associated with a rewards category relatively higher), account interest rates (e.g., by scoring accounts with lower interest rates relatively higher), available balances (e.g., by scoring accounts with lower balances relatively higher), etc. In embodiments, the contextual information may be weighted for scoring purposes.

At step 4.3, the payment processing system 215 may select one or more payment accounts to charge for the transaction based on the scores. For example, for each item in the transaction, the payment account with the highest score is selected to pay for that item. If the same account is scored highest for all items in the transaction, then only that one account will be selected to pay for the transaction. If multiple different accounts are scored highest for different items in the transaction, then the multiple different accounts are selected. Further the payment processing system 215 may determine a total amount to charge each selected account by adding the price of each item selected for each account.

At step 4.4, the payment processing system 215 may provide information identifying the payment account selections to the POS terminal 212. At steps 4.5 and 4.6, the POS terminal 212 may communicate with different payment account servers 220 (e.g., payment account server 220-1 and payment account server 220-2) associated with different payment accounts and provide the payment details for each selected account to charge. In embodiments, the POS terminal 212 may provide the payment details to a single payment account server 220 (e.g., when only a single account is selected for the transaction, or when the single payment account server 220 is associated with multiple different payment accounts).

Figure 4B:
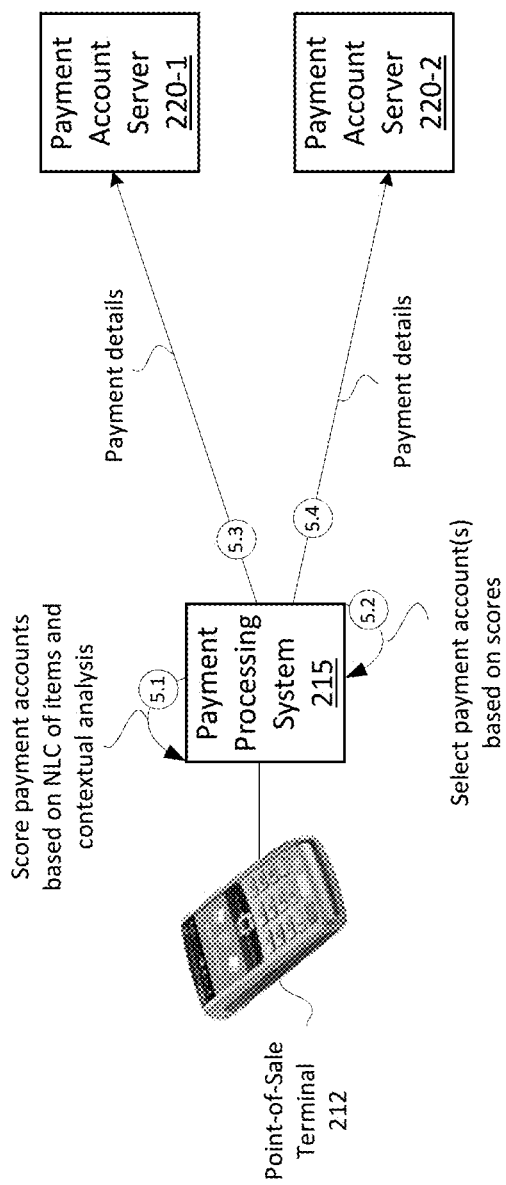

Referring to FIG. 4B, in an alternative embodiment, the payment processing system 215 may be implemented within a point-of-sale (POS) terminal 212 or other payment computing device implemented in a merchant facility. In this embodiment, the POS terminal 212 may receive user login information and access the user's profile and/or electronic wallet to select payment accounts from the electronic wallet. The payment processing system 215 (implemented by the payment processing system 215) may select the payment accounts in a similar manner as described above with respect to FIG. 4A. For example, at step 5.1, the payment processing system 215 may score payment accounts associated with the user from which to pay for the items in the transaction based on the classification of each item and based on contextual analysis of other analytics data associated with the user and/or the transaction (e.g., in a similar manner as described above with respect to step 4.2). At step 5.2, the payment processing system 215 may select one or more payment accounts to charge for the transaction based on the scores (e.g., in a similar manner as described above with respect to step 4.3). At steps 5.3 and 5.4, the payment processing system 215 may provide the payment details to charge the selected accounts. In another embodiment, a payment processing system 215 may host an online shopping system via which a user may place an online order. The payment processing system 215 may access the user's profile using login credentials for the user, and select the accounts to charge in a similar manner as described above.

Figure 4C:
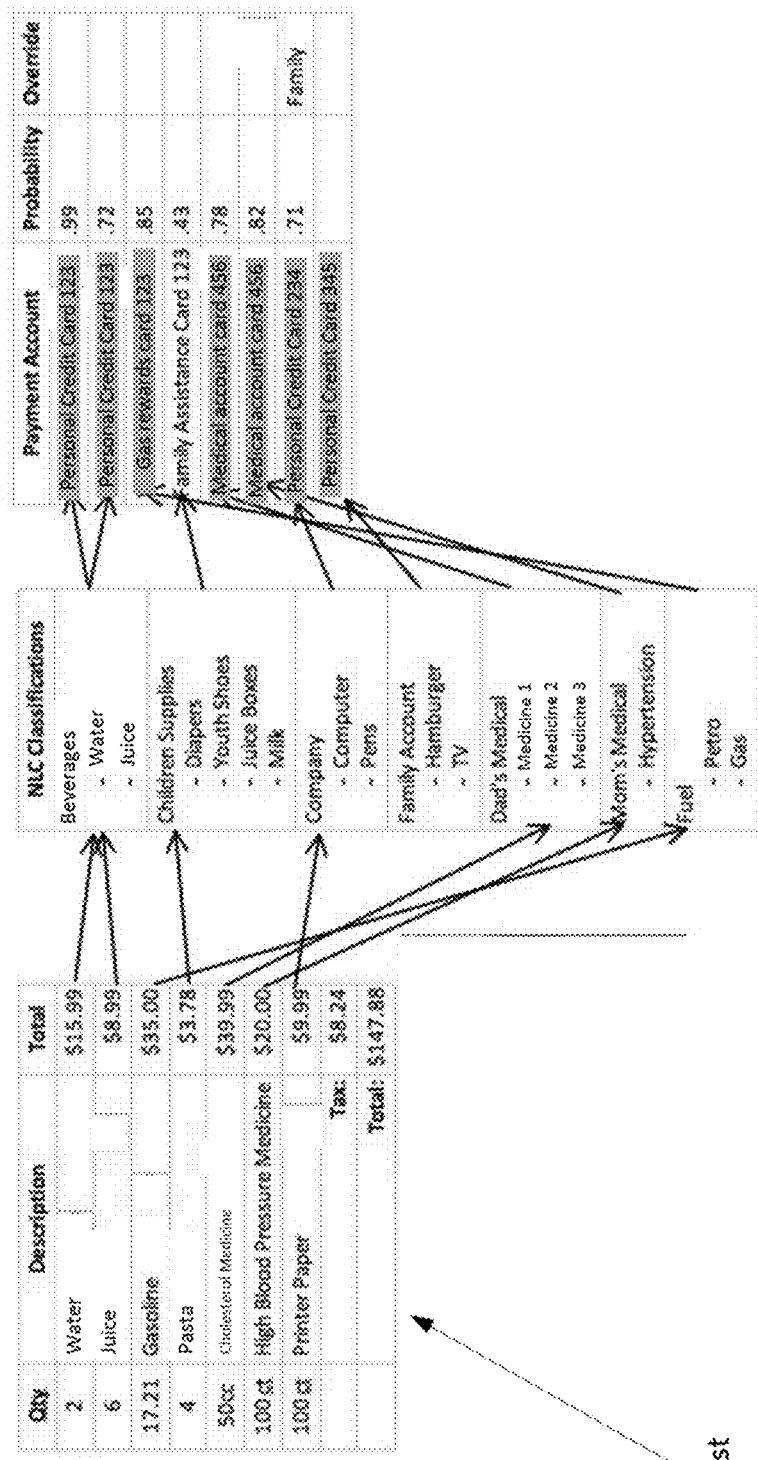

Referring to FIG. 4C, a user may checkout of a merchant facility in which items are scanned into a point-of-sale terminal. The user may use his or her user device to pay for the items, at which point the payment processing system 215 implemented within the user device may analyze a list of items in the transaction and classify the items. Based on the classifications, the payment accounts are scored for each item/classification of item, and the highest score payment accounts are selected to pay for specific items. For example, a probability or confidence score may be determined based on the NLC information and/or contextual information. As an example, "Water" matches the user's training data set indicating that the item should be classified as "beverage." Further, the payment processing system 215 may store training data that defines a criterion that items with the "beverage" classification are assigned to the user's personal credit card 123. As another example, and other item "Juice" may not be in the user's training data set, yet the NLC algorithm implemented by the payment processing system 215 may predicts a 72% probability that the user would wish to use his or her personal credit card 123 as "Juice" is a kind of beverage.

As another example, "Gasoline" may not match the training data, yet a learning model implemented by the payment processing system 215 predicts that "Gasoline" is another name for "Fuel" and thus assigns an 85% probability that the user would wish to a gas rewards card. As another example, "Atorvastatin" is type of cholesterol medicine and while the training data may not explicitly define this item as medication, the payment processing system 215 may determine that this item belongs to the user's father (e.g., based on other training and/or user data identifying the user's family) and, the medical payment account should be selected.

As another example, the payment processing system 215 may predict that "Printer Paper" is an office supply and should be charged to a company account. However, the user may know that the company does not cover office supplies at the user's home as those supplies are provided in the office and, thus, the user overrides this classification and manually selects the more appropriate account. This "override" feature sends information identifying manually selected accounts back into learning model and training data set such that the payment processing system 215 may update its classification algorithms to more accurately classify this item (and related items) in the future. In this way, the payment processing system 215 "learns" correct classifications for items over time and improves its accuracy. In embodiments, the payment processing system 215 learns for the individual user specifically and not as a coarse grain classification whereby "printer paper" should appropriately be charged to a company card.

Figure 4D:
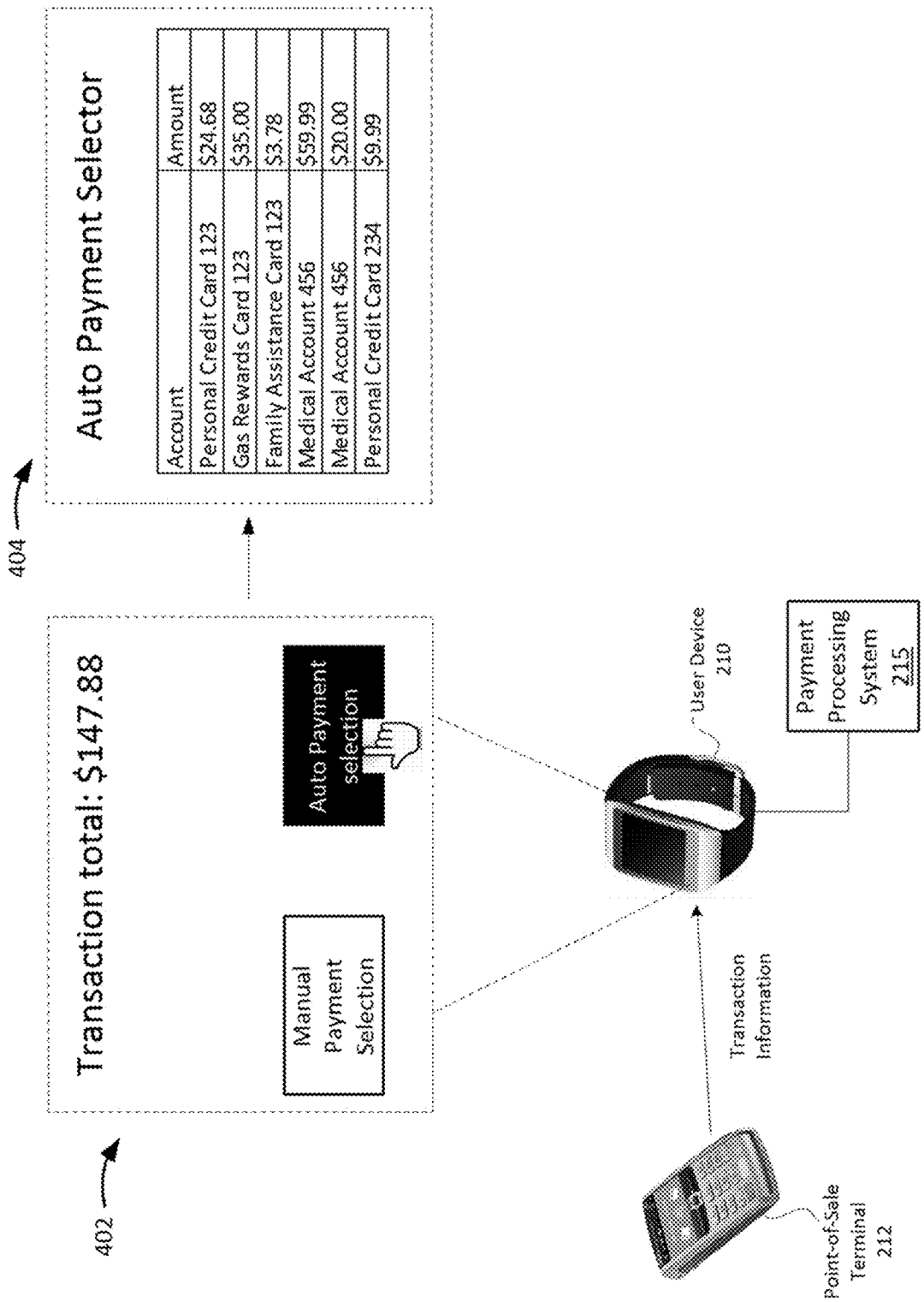

Referring to FIG. 4D, the user device 210 may display a graphical user interface (GUI), such as GUI 402. The GUI 402 may be used to manually select a payment account, or to auto-select a payment account (e.g., based on receiving transaction information from the POS terminal 212). If the user selects to automatically select the payment account, the payment processing system 215 may, in accordance with aspects of the present invention, automatically select payment accounts and display the sub-totals of each selected account on the user device 210 (e.g., on GUI 404).

Figure 4E:
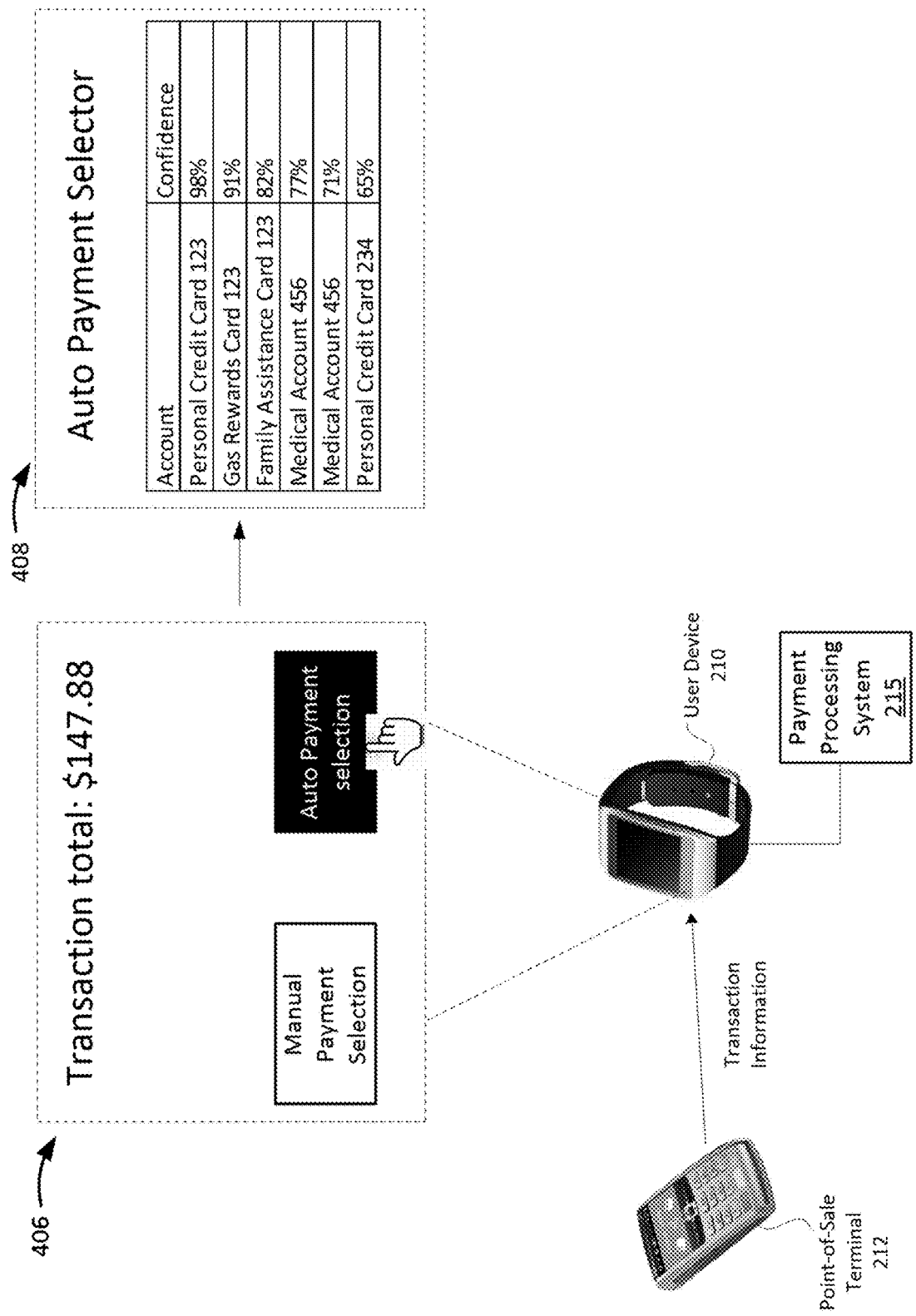

Referring to FIG. 4E, the payment processing system 215 may be used to automatically select a single account to pay for an entire transaction (e.g., based on receiving transaction information from the POS terminal 212). For example, as shown in FIG. 4E, when the user selects to automatically select the payment accounts (e.g., in GUI 406), a list of accounts may be presented on the user device 210 to make a whole payment for a transaction (e.g., within GUI 408). The list of accounts may be listed in order of confidence in which the confidence is calculated by the payment processing system 215 based on statistical models including machine learning data and/or training data as part of those models as described herein.

Figure 4F:
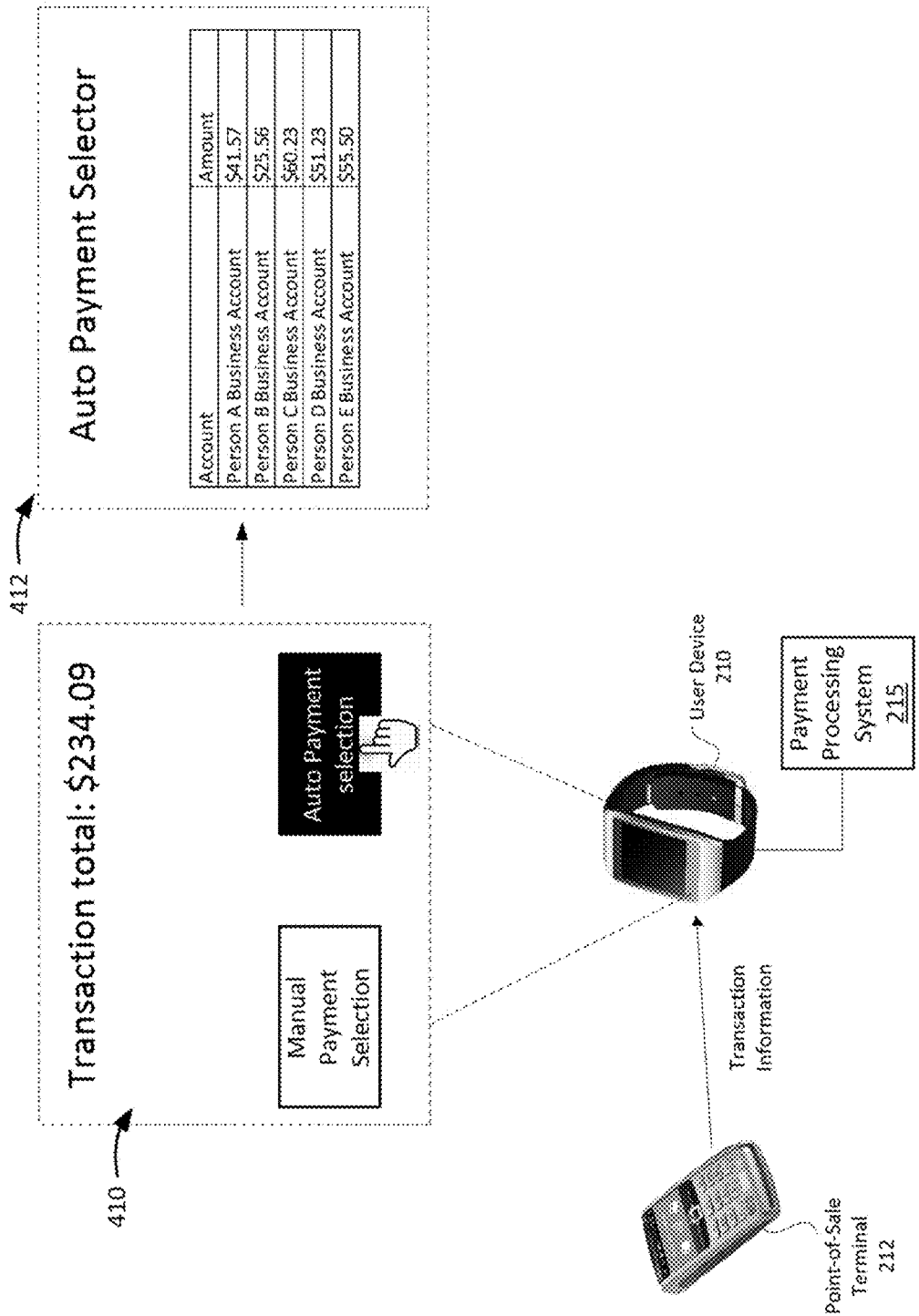

Referring to FIG. 4F, the payment processing system 215 may be used to automatically select different accounts associated with different users to pay for a single transaction (e.g., based on receiving transaction information from the POS terminal 212). For example, when the user selects to automatically select the payment accounts (e.g., in GUI 410) the payment processing system 215 may split a check in a restaurant for individual business accounts associated with different individuals (e.g., in a business meal setting). The payment processing system 215 may determine items ordered by each individual and in turn, amounts to charge for each individual account based on user preferences and/or machine learning techniques, and the user device 210 may display (e.g., in GUI 412) the amount to charge each individual account. In embodiments, individual user devices 210 associated with individual users may display the amounts to be charged to their respective accounts. Additionally, or alternatively, the user device 210 may display a ranked list of accounts (e.g., ranked in order of confidence scores) from which the user may select a single account to use to pay for the entire transaction.

Figure 5:
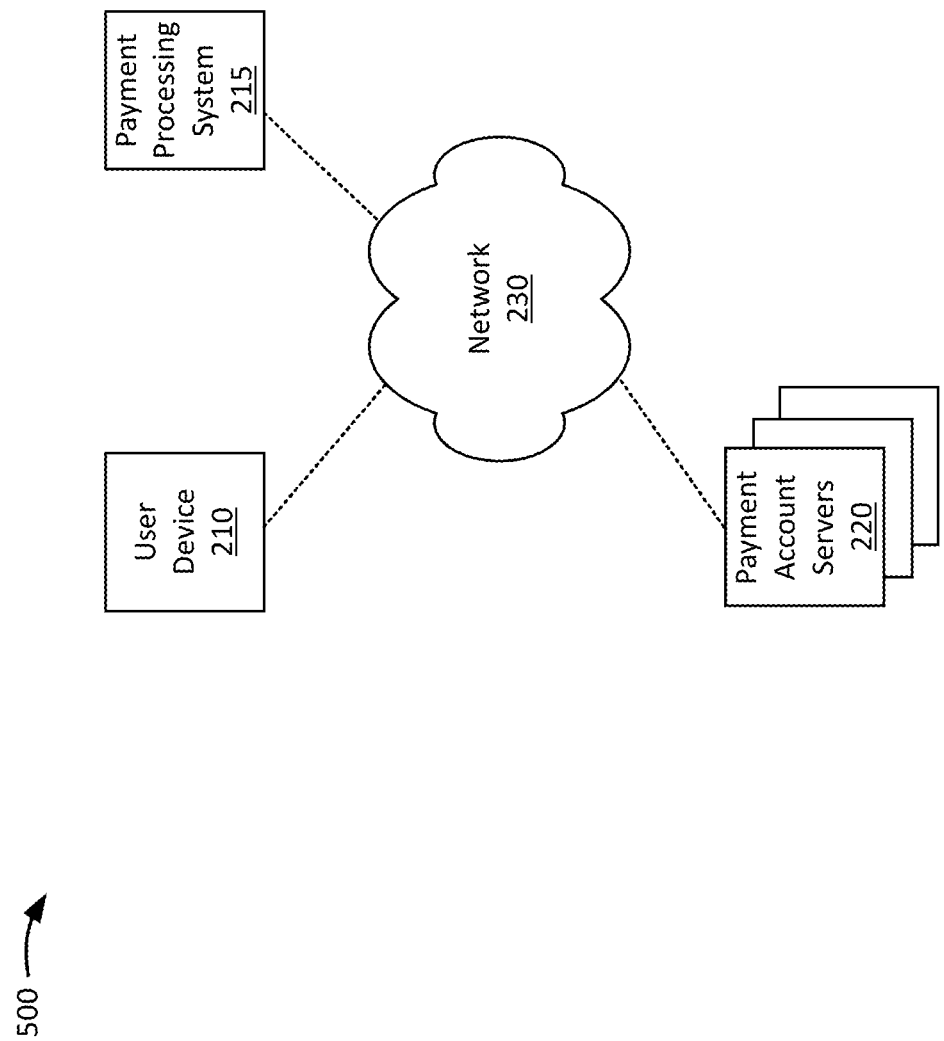
FIG. 5 shows an example environment in accordance with aspects of the present invention.

FIG. 5 shows an example environment in accordance with aspects of the present invention. As shown in FIG. 5, environment 500 may include a user device 210, a POS terminal 212, a payment processing system 215, one or more payment account servers 220, and a network 230. In embodiments, one or more components in environment 500 may correspond to one or more components in the cloud computing environment of FIG. 2. In embodiments, one or more components in environment 500 may include the components of computer system/server 12 of FIG. 1.

The user device 210 may include a device capable of communicating via a network, such as the network 230. For example, the user device 210 may correspond to a mobile communication device (e.g., a smart phone or a personal digital assistant (PDA)), a portable computer device (e.g., a laptop or a tablet computer), a smart watch, and/or or another type of device. In some embodiments, the user device 210 may be used to place online orders via which the payment processing system 215 may select one or more accounts to charge for the order/transaction. Additionally, or alternatively, the user device 210 may incorporate the payment processing system 215 to select one or more accounts to charge for a transaction.

The POS terminal 212 may include one or more computing devices (e.g., such as computer system/server 12 of FIG. 1) that may process a payment for a transaction within a merchant facility. In embodiments, the POS terminal 212 may access a user's profile and/or electronic wallet (e.g., by receiving user login information). In embodiments, the POS terminal 212 may incorporate the payment processing system 215 to select one or more accounts to charge for a transaction.

The payment processing system 215 may include one or more computing devices (e.g., such as computer system/server 12 of FIG. 1) that selects one or more payment accounts to use for a transaction. As described herein, the payment processing system 215 may select the payment accounts by classifying each item in a transaction, analyzing contextual/training data, and generating confidence scores for each payment account and item. The payment processing system 215 may automatically select a payment account for an item (e.g., when the confidence score satisfies a threshold) or may prompt the user to confirm or manually select a payment account (e.g., when the confidence score does not satisfy the threshold). In embodiments, the payment processing system 215 may be incorporated within the user device 210, the POS terminal 212, and/or an online merchant system. Alternatively, the payment processing system 215 may be implemented independently.

In embodiments, the payment processing system 215 may store account scoring criteria that defines weightings and scoring parameters/techniques for scoring payment accounts based on classification information for an item, contextual information, training data, user profile information, etc. As described herein, the criteria may be periodically updated based on machine learning techniques in which the scoring criteria is refined as user habits are learned or change over time. Additionally, or alternatively, the payment processing system 215 may store training data, such as historical account payment selection data. The payment processing system 215 may implement a contextual analyzer to analyze and factor in contextual data into the scoring of payment accounts.

The payment account server 220 may include one or more computing devices (e.g., such as computer system/server 12 of FIG. 1) that host payment accounts to be charged. For example, the payment account server 220 may be associated with a financial institution that processes payments based on charging details and charging authorization received from a merchant web server, merchant point-of-sale terminal, etc.

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
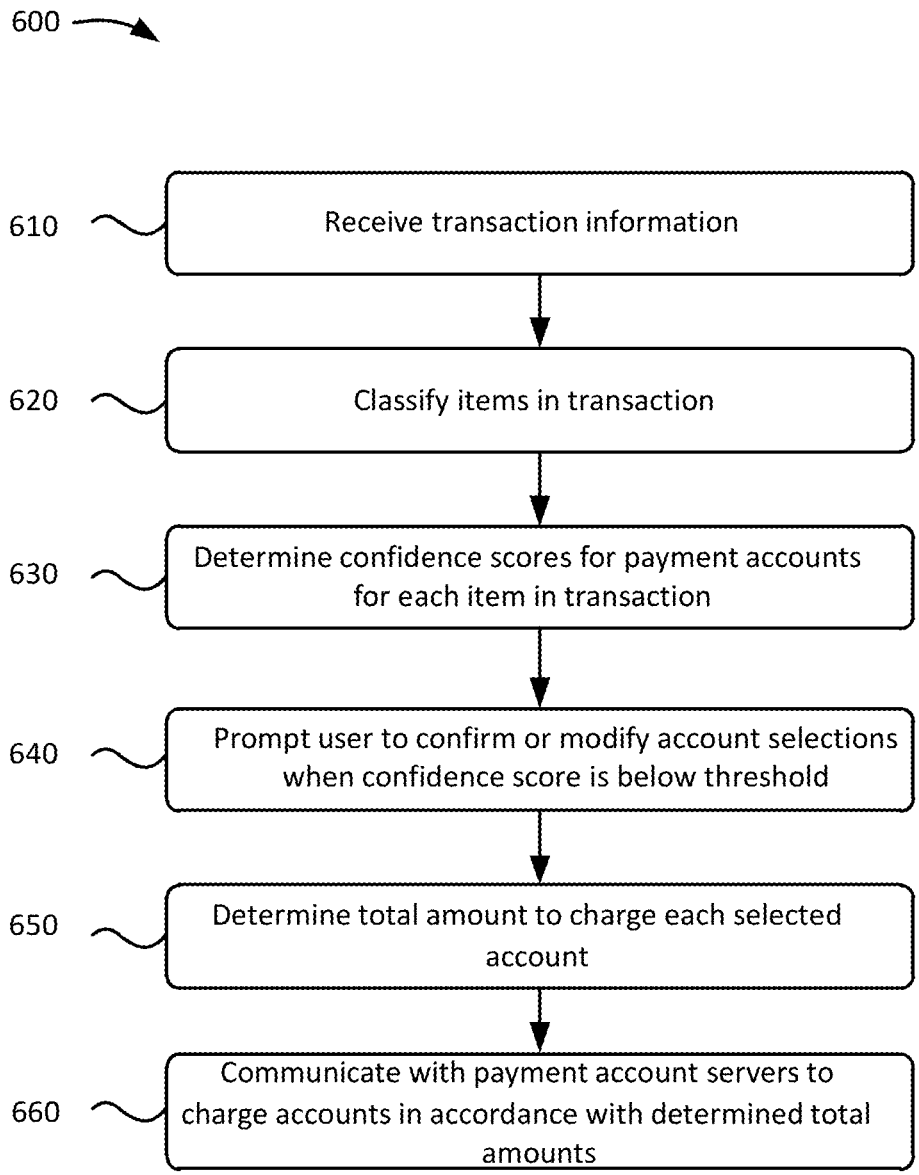
FIG. 6 shows an example flowchart of a process for selecting accounts to charge for paying for items in a transaction in accordance with aspects of the present invention.

FIG. 6 shows an example flowchart of a process for selecting accounts to charge for paying for items in a transaction. The steps of FIG. 6 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 6, process 600 may include receiving transaction information (step 610). For example, the payment processing system 215 may receive transaction information (e.g., from an online merchant system, a point-of-sale system, etc.). In embodiments, the transaction information may include information identifying the user via which a user profile may be accessed.

Process 600 may also include classifying items in the transaction (step 620). For example, as the payment processing system 215 may classify each item in the transaction by applying NLC techniques to the description of the item, and or by incorporating training and personal user information from the user's profile. Examples of classifying the items are described above with respect to FIGS. 4A and 4B.

Process 600 may further include determining confidence scores for payment accounts for each item in the transaction (step 630). For example, the payment processing system 215 may determine confidence scores for the payment accounts for each item based on the classifications, contextual information, and/or user profile information. In embodiments, the payment processing system 215 may determine confidence scores based on scoring criteria, weightings, contextual information, user profile information, etc. As described herein, the scoring criteria may include scoring parameters/techniques for scoring payment accounts based on classification information for an item, contextual information, training data, user profile information, etc. Examples of determining confidence scores are described above with respect to FIGS. 4A and 4B.

Process 600 may also include prompting the user to confirm or modify account selections when the confidence score is below a threshold (step 640). For example, the payment processing system 215 may present account selections based on the accounts with the highest confidence scores for each item. The payment processing system 215 may prompt the user to confirm or modify the selected accounts to charge (e.g., the accounts with the highest confidence scores). If the user modifies or overrides an account selection, the payment processing system 215 may save the information identifying the override to refine the confidence scoring algorithm for future use. In embodiments, the payment processing system 215 may only prompt the user to confirm or modify a selected payment account when the confidence score does not satisfy a threshold (e.g., is below the threshold). That is, step 640 may be omitted entirely if the confidence scores for the selected payment accounts for all items in the transactions satisfy the threshold.

Process 600 may further include determining a total amount to charge each selected account (step 650) and communicating with payment account servers to charge the accounts in accordance with the determined amounts (step 660). For example, the payment processing system 215 may determine a total amount to charge each selected account by adding the amounts of each item associated with a selected account. As an example, if items 1, 2, and 3 have been selected to be charged to account A, the payment processing system 215 may add the price amounts of items 1, 2, and 3 and communicate with the payment account server 220 associated account A to charge account A with the sum of the prices of items 1, 2, and 3. If items 4, 5, and 6 have been selected to be charged to account B, the payment processing system 215 may add the price amounts of items 4, 5, and 6 and communicate with the payment account server 220 associated account B to charge account B with the sum of the prices of items 4, 5, and 6.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by a computing device, transaction information for a transaction, wherein the transaction information identifies one or more items in the transaction;
    classifying, by the computing device, each of the one or more items;
    determining, by the computing device and prior to completing the transaction, confidence scores for each of a plurality of payment accounts for each item in the transaction;
    selecting, by the computing device and prior to completing the transaction, one or more payment accounts, of the plurality of payment accounts, to use to pay for the one or more items, the selecting being based on the confidence scores; and
    communicating, by the computing device, with one or more payment servers to charge the one or more payment accounts for the one or more items.

2. The method of claim 1, wherein the selecting one or more payment accounts comprises selecting two or more of the plurality of payment accounts,
- a first payment account of the plurality of payment accounts is selected to be charged for a first item of the one or more items in the transaction, and
- a second payment account of the plurality of payment accounts is selected to be charged for a second item of the one or more items in the transaction.

3. The method of claim 1, wherein the selecting the one or more payment accounts further comprises selecting the one or more payment accounts having a highest confidence score for each of the one or more items.

4. The method of claim 3, wherein the communicating with the one or more payment servers occurs without user input when the confidence scores satisfy a threshold.

5. The method of claim 3, further comprising prompting for user input to confirm or modify selections of the one or more payment accounts when the confidence scores do not satisfy a threshold, wherein the communicating with the one or more payment servers occurs after receiving the user input confirm or modify the selections.

6. The method of claim 1, wherein:
- the transaction information includes information identifying a user profile; and
- the classifying and the selecting are based on information in the user profile or contextual data.

7. The method of claim 6, wherein the user profile or the contextual data includes at least one selected from the group consisting of:
- merchant information;
- user geographic location;
- user calendar information;
- user preferences;
- user personal information; and
- payment accounts historically used to pay for items associated with particular classifications.

8. The method of claim 1, wherein the computing device is implemented as part of a user device, a point of sale terminal, or an online shopping system.

9. The method of claim 1, wherein the classifying is based on one or more natural language classification (NLC) techniques.

10. The method of claim 1, wherein a service provider at least one of creates, maintains, deploys and supports the computing device.

11. The method of claim 1, wherein the receiving the transaction information, the classifying the each of the one or more items, the selecting the or more payment accounts, and the communicating with the one or more payment servers are provided by a service provider on a subscription, advertising, and/or fee basis.

12. The method of claim 1, wherein the computing device includes software provided as a service in a cloud environment.

13. The method of claim 1, further comprising deploying a system for selecting payment accounts to pay for items in a transaction, comprising providing a computer infrastructure operable to perform the receiving the transaction information, the classifying the each of the one or more items, the selecting the or more payment accounts, and the communicating with the one or more payment servers.

14. A computer program product for automatically selecting one or more payment accounts to pay for items in a transaction, the computer program product comprising a computer readable storage medium having program instructions embodied therewith, the program instructions executable by a computing device to cause the computing device to:
- receive transaction information for a transaction, wherein the transaction information identifies one or more items in the transaction;
- determine, prior to completing the transaction, confidence scores for each of a plurality of payment accounts for each item in the transaction;
- select, prior to completing the transaction, one or more payment accounts, of the plurality of payment accounts, to use to pay for the one or more items, the selecting being based on the confidence scores; and
- communicate with one or more payment servers to charge the one or more payment accounts for the one or more items.

15. The computer program product of claim 14, wherein the selecting the one or more payment accounts further comprises selecting the one or more payment accounts having a highest confidence score for each of the one or more items.

16. The computer program product of claim 15, wherein the communicating with the one or more payment servers occurs without user input when the confidence scores satisfy a threshold.

17. The computer program product of claim 15, wherein the program instructions further cause the computing device to prompt for user input to confirm or modify selections of the one or more payment accounts when the confidence scores do not satisfy a threshold, wherein the communicating with the one or more payment servers occurs after receiving the user input confirm or modify the selections.

18. The computer program product of claim 14, wherein:
- the transaction information includes information identifying a user profile; and
- the classifying and the selecting are based on information in the user profile or contextual data.

19. A system comprising:
- a processor, a computer readable memory and a computer readable storage medium associated with a computing device;
- program instructions to receive transaction information for a transaction, wherein the transaction information identifies one or more items in the transaction and a user profile;
- program instructions to apply natural language (NLC) and machine learning techniques to classify each of the one or more items based on the user profile and contextual information;
- program instructions to, prior to completing the transaction, score each of a plurality of payment accounts for each item in the transaction based on the classification, the user profile, and the contextual information;
- program instructions to, prior to completing the transaction, select one or more payment accounts, of the plurality of payment accounts, to use to pay for the one or more items, the selecting being based on the scoring; and
- program instructions to communicate with one or more payment servers to charge the one or more payment accounts for the one or more items,
- wherein the program instructions are stored on the computer readable storage medium for execution by the processor via the computer readable memory.

20. The system of claim 19, wherein the user profile or the contextual information includes at least one selected from the group consisting of:

merchant information;
user geographic location;
user calendar information;
user preferences;
user personal information; and
payment accounts historically used to pay for items associated with particular classifications.

\* \* \* \* \*